US006832136B2

(12) United States Patent
Huber et al.

(10) Patent No.: US 6,832,136 B2
(45) Date of Patent: Dec. 14, 2004

(54) METHOD AND DEVICE FOR CONTROLLING A DRIVE UNIT OF A VEHICLE

(75) Inventors: Andreas Huber, Kornwestheim (DE); Horst Wagner, Stuttgart (DE); Ruediger Fehrmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,197

(22) PCT Filed: Apr. 10, 2001

(86) PCT No.: PCT/DE01/01411

§ 371 (c)(1),
(2), (4) Date: May 7, 2002

(87) PCT Pub. No.: WO01/79674

PCT Pub. Date: Oct. 25, 2001

(65) Prior Publication Data

US 2002/0152007 A1 Oct. 17, 2002

(30) Foreign Application Priority Data

Apr. 14, 2000 (DE) ........................................ 100 18 551

(51) Int. Cl.[7] .................................................. G06F 7/00

(52) U.S. Cl. ........................................... 701/1; 73/35.08

(58) Field of Search ................................ 201/1, 36, 78, 201/79, 83, 85, 93; 123/406.5, 406.52; 73/35.03

(56) References Cited

U.S. PATENT DOCUMENTS

| | | | | |
|---|---|---|---|---|
| 4,337,839 A | | 7/1982 | Taplin | |
| 4,345,558 A | * | 8/1982 | Yamaguchi et al. | 123/406.35 |
| 5,919,244 A | * | 7/1999 | Danz et al. | 701/57 |

FOREIGN PATENT DOCUMENTS

| | | |
|---|---|---|
| DE | 195 34 633 | 12/1996 |
| DE | 198 38 454 | 3/2000 |
| EP | 0 449 160 | 10/1991 |

* cited by examiner

*Primary Examiner*—Thomas G. Black
*Assistant Examiner*—Olga Hernandez
(74) *Attorney, Agent, or Firm*—Kenyon & Kenyon

(57) ABSTRACT

A device and a method for controlling a drive unit of a vehicle. Starting from the position of an operating element, a power determining signal may be preselected. The actuator element is controlled as a function of a filtered power determining signal. The signal is filtered with a filter having at least one high-pass filter and one low-pass filter connected in parallel. The filtering is performed so that the filtered signal has at least one corresponding pulse in a transition to a modified signal.

14 Claims, 3 Drawing Sheets

METHOD AND DEVICE FOR CONTROLLING A DRIVE UNIT OF A VEHICLE

FIELD OF THE INVENTION

The present invention relates to a method and a device for controlling a drive unit of a vehicle.

BACKGROUND OF THE INVENTION

A method and a device for controlling a drive unit of a vehicle are described in German Patent No. 195 34 633, for example. In the method and device described therein, changes in engine torque are delayed by low-pass filtering of the driver's selection. In addition, a pulse-shaped characteristic of the injection volume is proposed to achieve a smooth application of the engine, after which the amount of fuel injected is released for acceleration without delay.

Low-pass filtering has a negative effect on the spontaneity of the driving performance. In addition, with modern drive train concepts, an interaction between engine movement and drive train may be observed, so that load shock may be further intensified.

SUMMARY OF THE INVENTION

Changes of state between thrust and traction may be implemented very rapidly due to the fact that a filter in which at least one high-pass filter and one low-pass filter are connected in parallel is used. Due to the rapid change of state, a spontaneous response of the vehicle to the driver's selection may be implemented. Damping of shock on arrival in the new contact position yields a definite noise reduction during the load reversal process, a reduction in the load shock at load reversal as a result of minor changes in the driver's selection and a reduced bucking tendency of the drive train.

Due to the parallel connection of the signals of the high- and low-pass filters and the fact that the variation of their phase angles is applied to the engine-drive train combination, the driving performance may be designed to be largely independent of the damping of load shock.

When there are gradual changes in driver's selection, a comfortable transition in state is possible even without acceleration and deceleration of masses. With such an excitation, there is no intervention by the load shock damper.

Due to the special combination of filters, the masses of the drive train are accelerated by at least one moment pulse and are decelerated again prior to reading the new contact position, so the position of this pulse relative to the time of the change in quantity selection as well as the position of the pulses relative to one another are variable.

DETAILED DESCRIPTION

Figure 1:
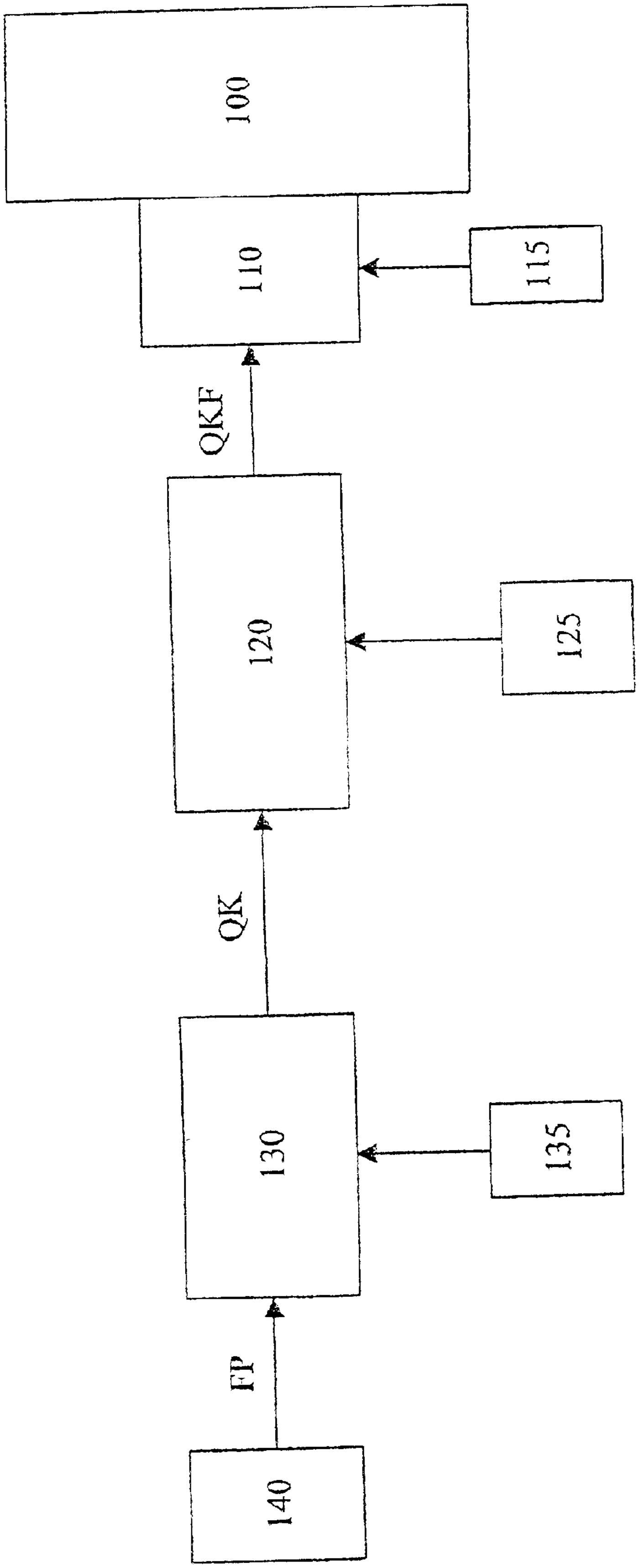
FIG. 1 shows a block diagram of a device for controlling a drive unit of a vehicle according to the present invention.

FIG. 1 shows a block diagram of a device for controlling the drive unit of a vehicle in which the procedure according to the present invention may be used. The procedure according to the present invention is illustrated here with the example of a diesel engine. However, the procedure according to the present invention may also be used with other types of internal combustion engines, in particular engines having spark ignition.

The figure shows an internal combustion engine 100 connected to a controller 110. Controller 110 processes signals of various sensors 115 and a signal QKF supplied by a filter means 120. Filter means 120 receives signal QK as an input quantity. The filter means also processes the output signals of various sensors 125. Signal QK is supplied by a quantity input 130. The quantity input receives signals from a accelerator pedal position sensor 140 and various sensors 135.

Starting from the position of the accelerator pedal, the accelerator pedal position sensor 140 generates a signal FP with regard to the position of the accelerator pedal. The accelerator pedal position sensor may be designed as a rotary potentiometer, for example. A resistance value and/or the voltage drop on the potentiometer is used as the signal in this case.

Starting from the output signal of accelerator pedal position sensor 140 and the output signals of various sensors 135, quantity setpoint 130 calculates signal QK, which is a measure of the power desired from the engine. Fuel quantity QK is selected, for example, according to sensors 135, which detect various temperature values, pressure values and other operating states.

In the case of a diesel engine, this is may be the quantity of fuel to be injected. In the case of an engine having spark ignition, this is may be a signal indicating the throttle valve position or the ignition time.

Figure 2:
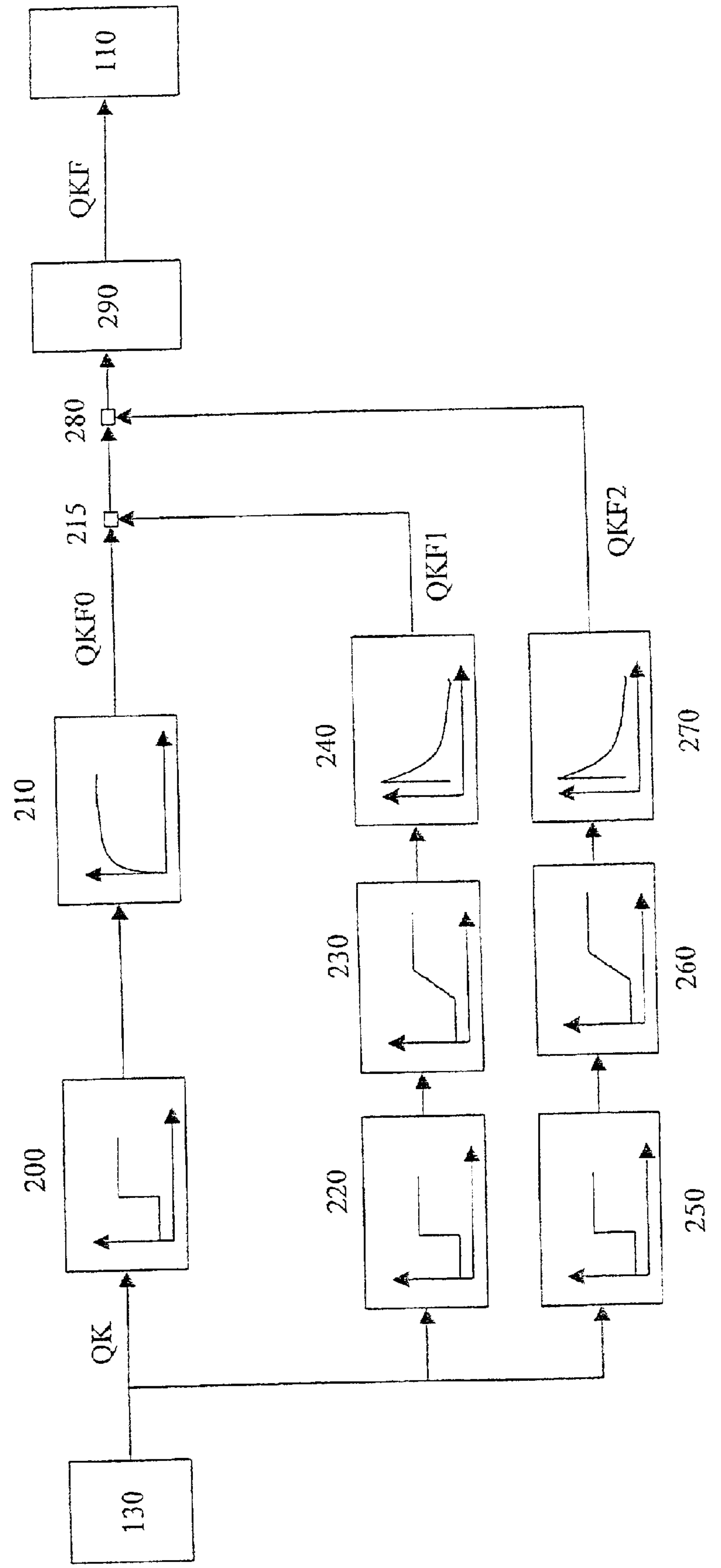
FIG. 2 shows a detailed illustration in the form of a block diagram of the device for controlling a drive unit of a vehicle according to the present invention.

To prevent load shock, the injection quantity must not be released suddenly in the case of a diesel engine. It is sufficient here to filter the injection quantity only in the range in which the engine is moving relative to the vehicle body. This filtering of the fuel quantity signal takes place through filter means 120, with the filtering depending on various status parameters characterizing the state of the combustion engine and/or the vehicle driven. Filtering can depend on rpm, which is detected by an rpm sensor 125. The transmission performance of filter means 120 is shown in FIG. 2. Filtered quantity signal QKF is sent to controller 110.

Actuator 110 is, for example, a fuel metering device which sets the quantity of fuel to be injected. It may be, for example, a solenoid valve. Depending on filtered fuel quantity signal QKF and the output signals of other sensors 115, controller 110 apportions the proper amount of fuel to combustion engine 100.

The procedure according to the present invention is not limited to use with diesel engines. It may also be used with other internal combustion engines. Furthermore, it is not limited to use with fuel injection. It may also be used with other quantities that determine power delivery, such as the throttle valve setting or the firing angle.

FIG. 2 shows filter means 120 in detail. Elements already described in conjunction with FIG. 2 are labeled here with the same reference numbers. Quantity request signal QK goes to a first lag element 200, a second lag element 220 and a third lag element 250. A low-pass filter 210 receives the output signal of first lag element 200. Signal QKF0 is available at the output of low-pass filter 210 and acts on a first coupling point 215.

The output signal of second lag element 220 goes via a first input limiter 230 to a first high-pass filter 240. Output signal QKF1 is available at the output of the first high-pass filter and is sent to first coupling point 215.

The output signal of third lag element 250 goes over a second input limit 260 to a second high-pass filter 270. The output signal of second high-pass filter 270 goes to a second coupling point 280 at whose second input the output signal of first coupling point 215 is available. The output signal of coupling point 280 goes to actuator 110 as filtered quantity request QKF via an output limiter 290.

A PTD1 element may be used as low-pass filter 210. However, other filters having low-pass characteristics may also be used according to the present invention. Filters having a DT1 characteristic may be used as the first and second high-pass filters. However, other filters having high-pass performance characteristics may also be used.

In a simplified embodiment, third lag element 250, second input limiter 260 and/or second high-pass filter 270 may be omitted. The arrangement of lag elements 200, 220 and 250 is selected only as an example. These lag elements may also be arranged downstream from the input limit or downstream from the low- or high-pass filters. Instead of these lag elements, special low- and high-pass filters containing higher-order elements may also be used. In addition, it is possible to omit input limiters 230, 260 and output limiter 290, depending on the design.

Low-pass filter 210 determines the static transmission performance of the filter. Likewise, this transmission element essentially determines the response to the driver's selection.

In the case of a change in input quantity QK, a fuel quantity pulse that guarantees acceleration and deceleration of the masses is needed. This fuel quantity pulse is supplied by high-pass filters 240 and 270. The signals of filters 210, 240 and/or 270 are phase shifted in time relative to one another by lag elements 220 and 250. This guarantees the chronological sequence of pulses and thus the desired variation of the output signal. Through suitable selection and/or dimensioning of the lag elements, the location of this pulse relative to the time of the change in quantity request and the relative position of pulses may be applied. It is especially advantageous if the lag elements and thus the phase shift are selected so they are variable, depending on the operating state of the engine and/or the vehicle. Suitable parameters for characterizing the operating state include the rpm of the internal combustion engine, the load of the internal combustion engine, the driving speed and/or other parameters.

High gains of high-pass filters 240 and 270 permit damping of load shock with even a small change in quantity input QK. Input limits 230 and 260 prevent an excessively strong intervention when there are large changes in signal QK.

According to the present invention, input limiters 230 and 260 may be preselected according to quantity request QK. In the case of medium and high loads, the drive train usually rests securely. Changes in quantity request in this range do not usually cause any transition in state between thrust and traction. Therefore, no load shock can occur here either. Input limits 230 and 260 are designed so that damping of load shock is deactivated at these operating points.

Output limit 290 guarantees that the highest allowed quantity values are not exceeded. Through suitable choice of lag elements, input limiter, the transmission characteristic of the high-pass filters, the low-pass filter and output limiter, the performance of the filter may be optimally adapted to any desired vehicle.

Figure 3:
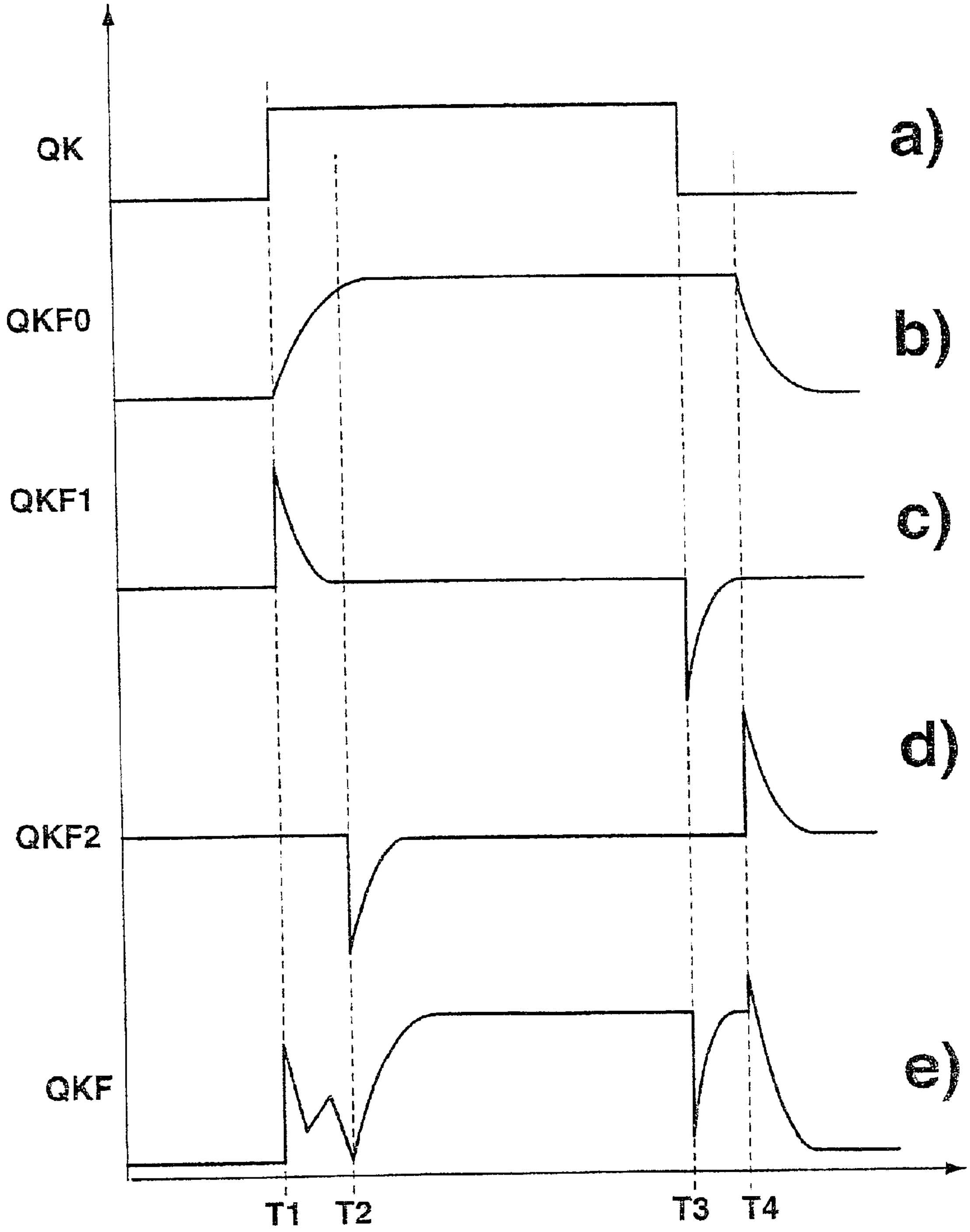
FIG. 3 shows filtered signals plotted over time.

FIG. 3 shows the behavior of the various signals plotted as a function of time. At time T1, the quantity request changes to an increased quantity. At time T3, the quantity request returns to its original level. This is plotted in Subfigure 3*a*. Subfigure 3*b* shows the output signal of low-pass filter 210. After time T1, signal QKF0 approaches its new end value according to an exponential function, for example. After time T3, signal QF0 does not return directly, but instead the transition to its original output value takes place only after a certain delay after time T4. This lag between time T3 and time T4 is caused by first lag element 200.

Subfigure 3*c* shows a diagram of output signal QKF1 of the first high-pass filter. This filter produces a positive pulse at time T1 and a negative pulse at time T3, i.e., the first high-pass filter produces a positive quantity pulse in the transition to increased fuel quantities and a negative quantity pulse in the transition to lower fuel quantities.

Output signal QKF2 of second high-pass filter 270 is plotted in Subfigure 3D. The second high-pass filter produces a negative quantity pulse in the transition to larger quantities and a positive quantity pulse in the transition to smaller quantities. Furthermore, the respective quantity pulse is delayed by lag element 250 by a certain lag time, i.e., the negative pulse does not occur at time T1 but instead occurs at time T2, and the positive quantity pulse does not occur at time T3 but instead at time T4.

In the embodiment illustrated here, a first high-pass filter generates a positive quantity pulse in the transition to larger quantities and a negative quantity pulse in the transition to lower quantities. The second high-pass filter generates an inverse quantity pulse with a time lag. The low-pass filter connected in parallel relays the corresponding quantity request directly with a given characteristic. Output signal QKF of filter means 120 as illustrated in Subfigure 3*a* is obtained by addition of these three filtered signals.

Two corresponding quantity pulses can occur in the transition to an altered quantity request. In other words, in the transition to an increased quantity, there is first a positive quantity pulse and then a negative quantity pulse, and in the transition to smaller quantities there is first a negative quantity pulse and then a positive quantity pulse. This guarantees that no load shock will occur.

The procedure according to the present invention is not limited to the embodiment described here having a low-pass filter and a high-pass filter. In particular, corresponding digital filters having a suitable performance characteristic may also be used. It is essential that filtering takes place so that the filtered signal has at least a corresponding pulse in the transition to a modified signal. This means that a positive pulse occurs in the transition to an increased value, and a negative pulse occurs in a transition to a lower value.

The procedure according to the present invention has so far been illustrated using the example of fuel quantities. However, the procedure according to the present invention may also be used accordingly for torque signals or other quantities corresponding to the quantity of fuel.

The quantity request received by the control element can be filtered accordingly. However, the output signal of sensor 140 or another quantity corresponding to the driver's selection may also be filtered accordingly.

What is claimed is:

1. A method of controlling a drive unit of a vehicle having an actuator element for influencing power provided to the drive unit, the method comprising:

determining a power determining signal from a position of an operating element of the drive unit of the vehicle;

filtering the power determining signal with a filter, the filter including at least one high-pass filter and at least one low-pass filter connected in parallel; and controlling the actuator element of the drive unit of the vehicle as a function of the filtered power determining signal.

2. The method according to claim 1, wherein the filtered power determining signal has at least one pulse that corresponds in direction to a direction of a change in power derived from the power determining signal.

3. A method of controlling a drive unit of a vehicle having an actuator element for influencing power provided to the drive unit, the method comprising:

determining a power determining signal from a position of an operating element;

filtering the power determining signal with a filter, the filter including at least one high-pass filter and at least one low-pass filter connected in parallel; and controlling the actuator element as a function of the filtered power determining signal;

wherein the at least one high-pass filter includes first and second high-pass filters connected in parallel.

4. The method according to claim 3, wherein signals of at least one of i) both the first and second high-pass filters, and ii) the low-pass filter are phase-shifted relative to one another.

5. A device for controlling a drive unit of a vehicle having an actuator element for influencing power provided to the drive unit, comprising:

a quantity input determining unit for determining a power-determining signal from a position of an operating element of the drive unit of the vehicle; and a filter unit coupled to the quantity input determining unit, the filter unit including at least one high-pass filter and one low-pass filter connected in parallel, the filter unit filtering the power-determining signal output from the quantity input determining unit, wherein the actuator element of the drive unit of the vehicle is controlled as a function of the filtered power-determining signal.

6. The device according to claim 5, wherein the filtered power-determining signal has at least one pulse that corresponds in direction to a direction of a change in power derived from the power-determining signal.

7. The method according to claim 1, wherein the operating element of the drive unit of the vehicle includes at least one of an acceleration pedal of the vehicle and a rotary potentiometer.

8. The method according to claim 1, wherein the actuator element of the drive unit of the vehicle includes at least one of a fuel metering device and a solenoid valve.

9. The device according to claim 5, wherein the operating element of the drive unit of the vehicle includes at least one of an acceleration pedal of the vehicle and a rotary potentiometer.

10. The device according to claim 5, wherein the actuator element of the drive unit of the vehicle includes at least one of a fuel metering device and a solenoid valve.

11. A device for controlling a drive unit of a vehicle including an actuator element for influencing power provided to the drive unit, comprising:

a quantity input determining unit configured to determine a power-determining signal from a position of an operating element of the drive unit of the vehicle; and a filter unit coupled to the quantity input determining unit, the filter unit including at least one high-pass filter and one low-pass filter connected in parallel, the filter unit configured to filter the power-determining signal output from the quantity input determining unit;

wherein the actuator element of the drive unit of the vehicle is configured to be controlled as a function of the filtered power-determining signal.

12. The device according to claim 11, wherein the filtered power-determining signal has at least one pulse that corresponds in direction to a direction of a change in power derived from the power-determining signal.

13. The device according to claim 11, wherein the operating element of the drive unit of the vehicle includes at least one of an acceleration pedal of the vehicle and a rotary potentiometer.

14. The device according to claim 11, wherein the actuator element of the drive unit of the vehicle includes at least one of a fuel metering device and a solenoid valve.

* * * * *